United States Patent [19]
Royle

[11] Patent Number: 6,036,076
[45] Date of Patent: Mar. 14, 2000

[54] CONTINUOUS SECTION PIPE AND PIPELIKE STRUCTURES

[76] Inventor: Ian A. Royle, 10323 Huntington Place Dr., Houston, Tex. 77099

[21] Appl. No.: 09/071,522

[22] Filed: May 1, 1998

Related U.S. Application Data

[60] Provisional application No. 60/045,384, May 2, 1997.
[51] Int. Cl.[7] .................................................. B23K 15/00
[52] U.S. Cl. ...................... 228/102; 228/101; 219/137 R; 219/136; 219/60 A; 219/125.11; 219/121.12
[58] Field of Search .................................. 228/102, 101; 219/137 R, 136, 60 A, 125.11, 121.12

[56] References Cited

U.S. PATENT DOCUMENTS

| | | | |
|---|---|---|---|
| 4,471,204 | 9/1984 | Takafuji et al. | 219/121 LD |
| 5,096,449 | 3/1992 | Matsuzaki | 445/36 |
| 5,686,002 | 11/1997 | Flood et al. | 219/137 R |

*Primary Examiner*—Patrick Ryan
*Assistant Examiner*—M. Alexandra Elve
*Attorney, Agent, or Firm*—Thomas A. Kahrl, Esq.

[57] ABSTRACT

A system of machined and welded pipe with no connectors or scarfed welds and method to provide a continuous section for pipe and pipe-like structures; displaying electron beam welding for constructing continuous pipe.

10 Claims, 7 Drawing Sheets

CONTINUOUS SECTION PIPE AND PIPELIKE STRUCTURES

This is a "Non-Provisional" Patent Application which must be filed no later then twelve months from the filing date of "Provisional" Patent Application Ser. No. 60/045,384, filed May 2, 1997. This application claims the benefit of U.S. Provisional Application No. 60/045,384, filed May 2, 1997.

BACKGROUND OF THE INVENTION

1. Field of the Invention (Technical Field)

The present invention relates to joints in continuous pipes and pipe-like structures, particularly oil and gas drill and production pipes and to a method of connecting drill pipe.

2. Background Art

Present drill pipes depend on connectors to join manageable lengths of pipe together to form a drill string. Because of the stresses, the joints must be reinforced by using thick section or saddles. These connectors are inherently heavier than the pipe they join. In most cases, such as A.P.I., the full section is wastefully continued in the total pipe length.

A thinner wall pipe could be used if the connection was continuous. Welding of the tube with conventional methods is lower in strength than the parent metal and the time to weld is too long to weld the length during oil production (typical).

Present methods and systems of forming joints in continuous pipes and pipe like structures, particularly oil and gas drill and production pipes typically involve either machined joints or welded joints. Referring to the machined joints, typically they include the following components: a) Threads, b) Swaging, c) Wedging, d) Sliding, and e) Seal joints, whereas the welded joints involve the following components: a) Scarf welded, b) Welded and machined, c) Weld and field beat treatment.

The mechanical machined joints require costly machined pipe ends and fittings. Mechanical joints require assembly of several components and are limited by a MIX of materials (rubber/plastics and close tolerance parts). The result is a high cost penalty and a maintenance component for the life of the system, particularly where collars and rings have differing galvanic couples. For example, aluminum pipes with steel saddles corrode rapidly in sea water, causing the aluminum to fail.

The present welded pipes, although often semi-automatic, have metallurgical limitations because the scarfed ends must be welded using filler metal. This system requires large molten areas of metal causing loss of control of metallurgical chemistry and loss of control of grain growth and texture. The weld zone does not match the parent metal strength and integrity. The weld zone is generally larger than the pipe profile, requiring remachining or producing handling problems if disregarded. The weld zone also causes a variation in corrosion rates, causing loss of strength at or near the joint through stress corrosion or metal loss.

All the present systems have a severe limitation in that the pipe a) is not uniform in strength, b) is not uniform in sectional size, and c) cannot be processed to provide continuous laying or continuous drilling operations.

The new invention provides unprecedented levels of metallurgical integrity and parameter control in field operations, using standard mill products with no pre-machining costs. This invention solves all the present systems' problems and in particular overcomes the limitations expressed above of the prior technology, with particular reference to the following applications: a) Rotating drill pipe (oil fields land/seabed), b) Fluid transfer pipe: Horizontal production pipe oil/gas/water, "J" lay vertically deployed to seabed, c) Piles/pylons, d) Masts, e) Storage tanks land/sea, f) Flexible pipe: angle drilling oil/gas/water, contour land/seabed.

Accordingly, it is desirable to provide for a new and improved welded/machined drill pipe with no connectors and a method of providing a continuous pipe employing electronic beam welding for constructing continuous pipe to an undersea well extending undersea, by the application of its inherent parts.

SUMMARY OF THE INVENTION

The present invention is directed to a welded/machined drill pipe with no connectors to provide a continuous pipe to an undersea well extending undersea, and to a method of connecting pipe by using high energy deep penetration welds like Electron Beam "EBW" (or high powered laser).

Referring to the FIGS. 1–3 there is shown a method of connecting pipe by using high energy deep penetration welds like Electron Beam "EBW" (or high powered laser) wherein a fast, high purity weld can be formed. The EBW system produces a very narrow weld that is typically as good as the parent metal. EBW welds, being typically 0.01 to 0.03 inch wide, are quenched by the lower temperature parent metal and can be preheated and postheated by jumping the weld beam ahead and behind the weld pool. The EBW process can also place a cosmetic or reweld finish on the joint in micro seconds, by programming the weld parameters. Where 100% mechanical properties cannot be guaranteed because of low class material or contamination problems, the EBW can be made at an angle to the tube wall to increase the section length of the weld to compensate for the reduction in total mechanical properties. Electron Beam Welding can be programmed to produce a wide weld to absorb inaccurate or out-of-position joints, but the weld quality is not of the usual high standard.

Typically, during drilling operation or production pipe deployment, each pipe is fed into a vertical portable robot (or semi-auto weld jig) for high energy weld of the new pipe to the former. Typically EBW is performed in "hard" vacuum. However, if the beam source is close enough to the metal (as would be the case with a tubular section) then the weld area is protected from air using preferably a light weight gas like Helium (this diverts the electrons less than other inert gases like nitrogen or argon).

During retrieval of a drill pipe string, the robot or semi-auto system machines the pipe through (parts off) and stacks the pipe for the next deployment.

Because the EBW or laser weld is so narrow (this is where it gains its properties), it is necessary to maintain a good finish on the cut to provide a good fit (butt) for the next weld.

Friction welding could be used to perform this joint. However, the parameters surrounding the friction weld are difficult to control.

EBW in particular is reliable and repeatable. The High Energy Narrow weld is not as susceptible to chemical and metallurgical problems as conventional Tig Mig Friction as the weld causes very little metallurgical disruption.

The invention provides a constant, continuous, uniform thickness pipe, providing the highest strength possible for the lowest weight and lowest material cost.

This invention would lower cost of all major drilling and production pipe laying and make possible drilling and pipe laying to depths not possible with present systems.

The robotic unit is designed to be used efficiently on any rig with level of skill normally required by the industry.

During pipe drilling operations the cutting and rewelding of the drill pipe is not restricted to the original joint, providing an unrestricted operation.

A further improvement is the capability of welding thicker sections to the drill string as the depth increases. This, of course, provides for a thinner first stage series of pipes.

Accordingly, the object and purpose of the present invention is to provide a system of electronic beam welding machined fit connections for drill pipe.

Another object and purpose of the present invention is to provide a method of connecting machined fit connections for drill pipe employing electronic beam welding.

The invention will be described for the purposes of illustration only in connection with certain embodiments. However, it is recognized that those persons skilled in the art may make various changes, modifications, improvements and additions on the illustrated embodiments all without departing from the spirit and scope of the invention.

BRIEF DESCRIPTION OF THE DRAWINGS

The accompanying drawings, which are incorporated into and form a part of the specification, illustrate several embodiments of the present invention and together with the description serve to explain the principals of the invention. The drawings are only for the purpose of illustrating a preferred embodiment of the invention and are not construed as limiting the invention.

DETAILED DESCRIPTION OF THE PREFERRED EMBODIMENTS

Figure 1:
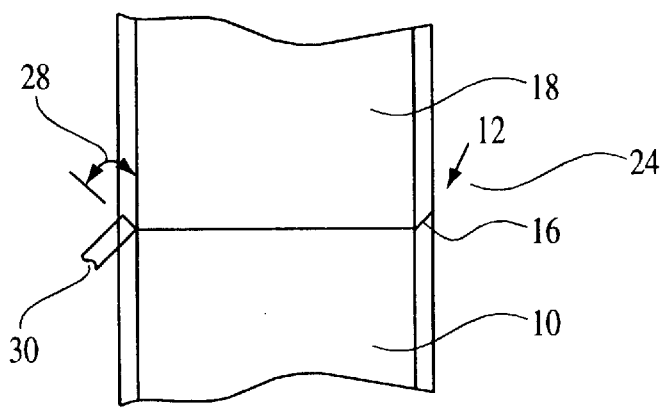
FIG. 1 is a side view in section of the continuous section of drill pipe of the present invention showing the welded/machined drill pipe with no connectors to provide a continuous pipe to an undersea well; displaying EBW with typical 120% of wall section (100% of yield stress) shown with no weight of saddles.
Figure 2:
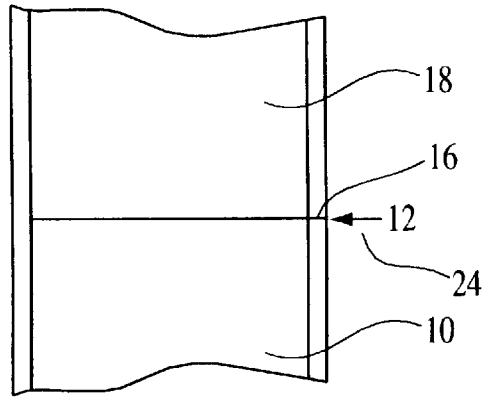
FIG. 2 is a side view in section of the invention of FIG. 1 showing the welded/machined drill pipe with no connectors to provide a continuous pipe to an undersea well; displaying EBW with typical 100% of wall section ((98% of yield stress) shown with no saddles.
Figure 3:
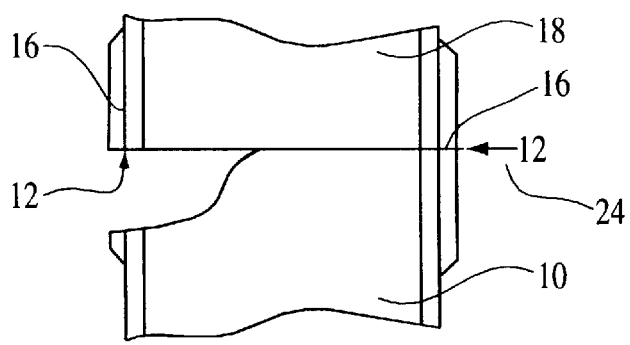
FIG. 3 is a side view in section showing reinforcement for storage containers, with typical 220% of wall section.
Figure 4:
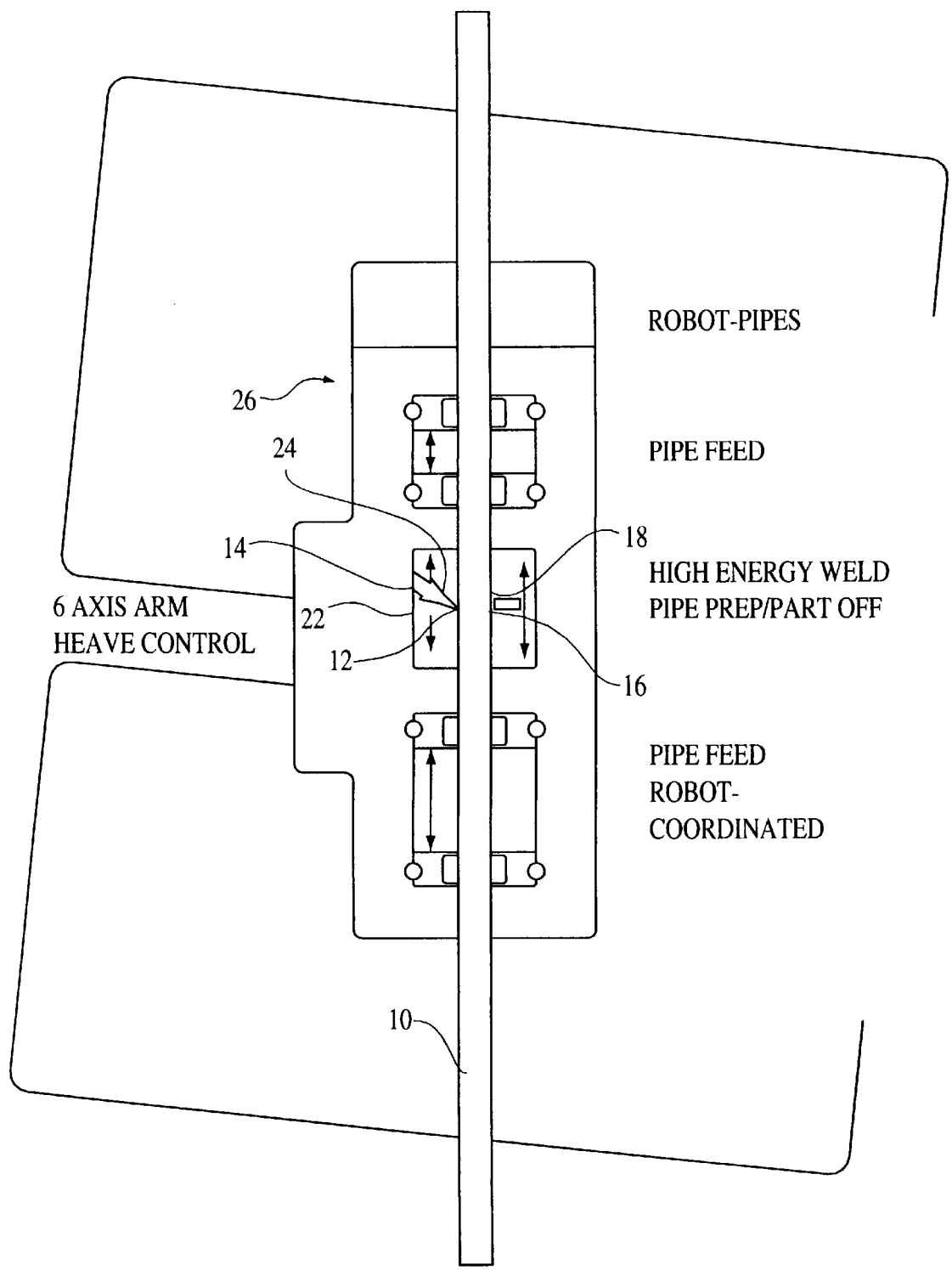
FIG. 4 shows a typical robot employed with the invention if FIG. 1 that controls the processing and deployment of a drill pipe or "J" lay production pipe and includes a robotic arm that controls positioning during heave of the ship created by wave formation of the sea.
Figure 5:
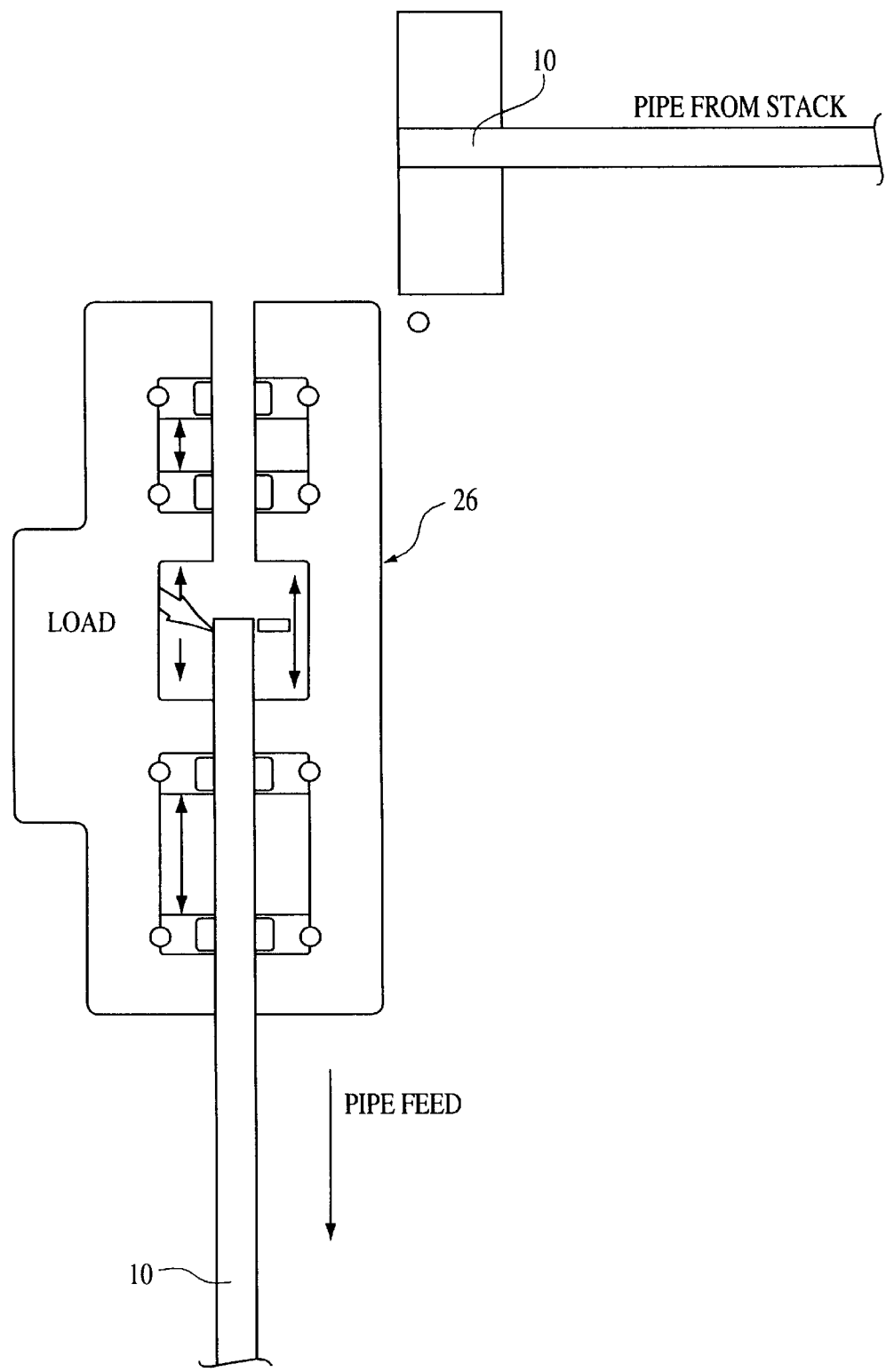
FIG. 5 is a schematic diagram showing the robot of FIG. 4 taking a pipe from the stack.
Figure 6:
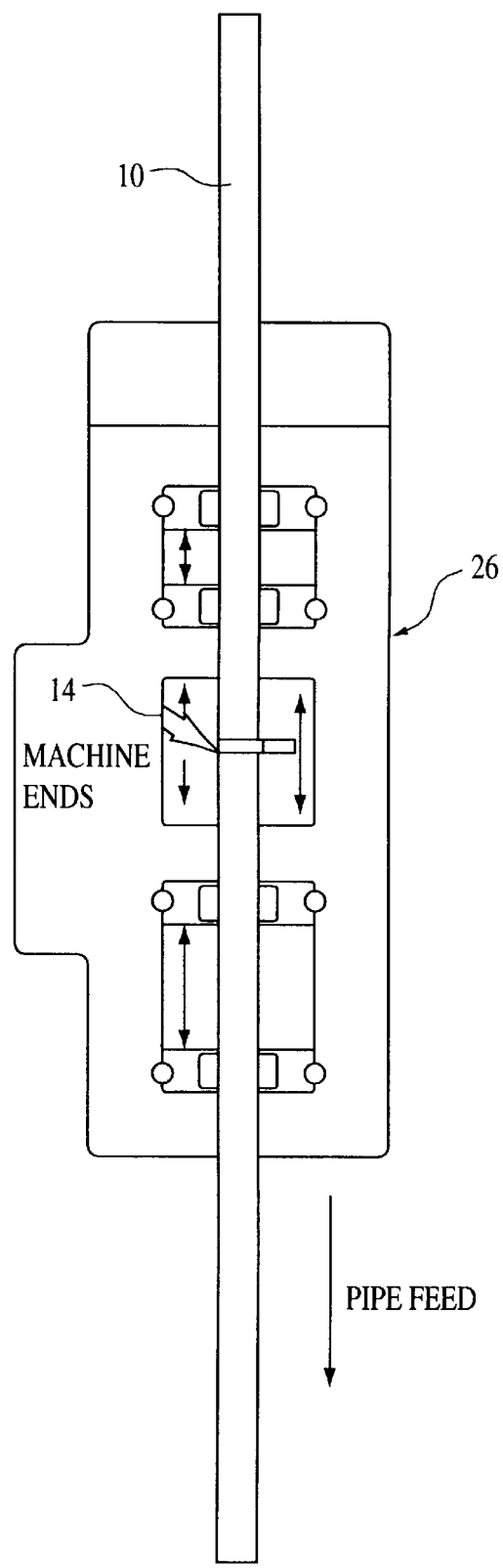
FIG. 6 is a schematic diagram showing the pipe of the invention of FIG. 1 in position on the previous pipe with the ends in position for machining.
Figure 7:
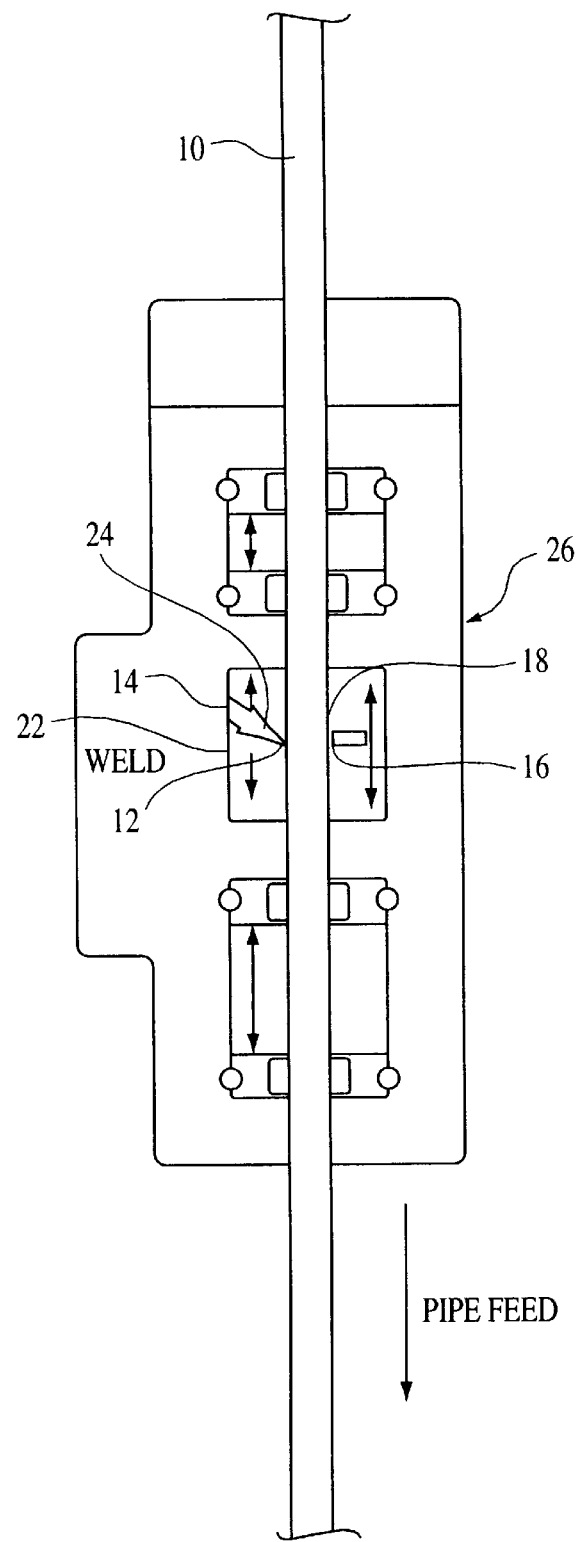
FIG. 7 is a schematic diagram showing the pipes of the invention of FIG. 1 butted together for welding.
Figure 8:
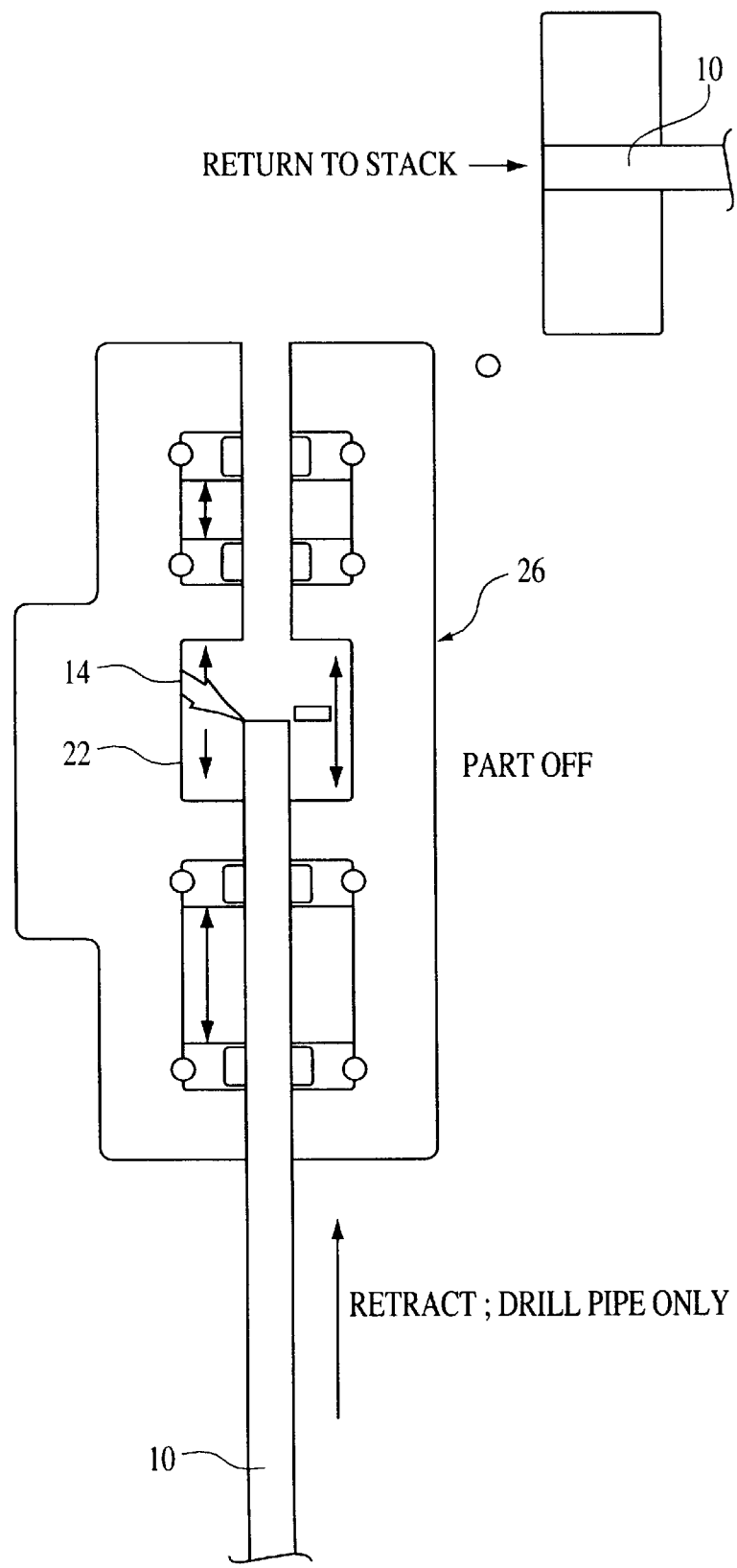
FIG. 8 is a schematic diagram of the invention of FIG. 1 showing a drill pipe being "parted off" during retrieval for pipe stacking.
Figure 9:
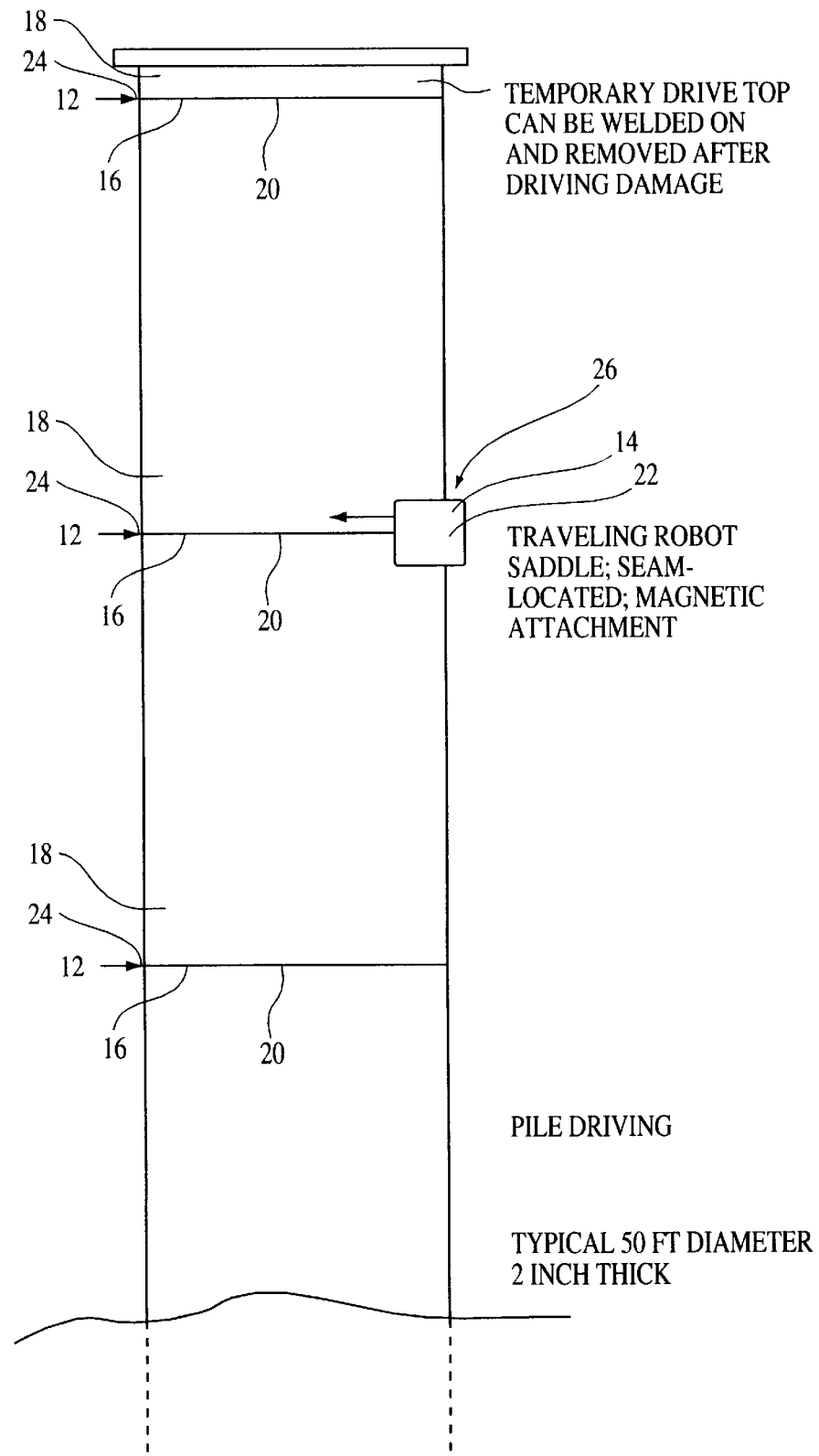
FIG. 9 shows the position of the joints and typical pile driving cap and the position of a cutting and welding robot, of the invention of FIG. 1, that rotates about the pipe section magnetically held to the pipe on rollers, for a typical 50' diameter, 2" thick pile.

Referring to the FIGS. 1–8 there is shown a welded/machined drill pipe 10 with no connectors to provide a continuous pipe to an undersea well extending undersea, and to a method of connecting pipe by using high energy deep penetration welds 12 like Electron Beam "EBW" (or high powered laser). The preferred embodiment employs a High Energy Welding System 14, typically Electron Beam, to produce an extremely narrow weld zone 16 of typically 0.01 to 0.03 inch. This system provides a weld with no measurable heat affected zone.

The high energy weld 12 takes place robotically at extremely high speed. The result is that the surrounding metal 18 quenches the narrow band of weld metal 20 at such a rate that grain growth and alloy dissolution does not change in the weld area. The secondary return of the remnants of the heat tempers the weld zone 16 to restore ductility. Preheat and postheat treatment can be programmed by controllers 22 to process parameters to control the microstructure of super strength alloys by jumping the beam 24 fore and aft of the weld 12 during rotation of the robot 26. By using an angled joint 28 in the pipe section, the weld 12 is longer than the section span of the pipe 10, this provides a total weld length 30 that is higher than the cross section of the pipe providing 100% pipe integrity and no loss of cross sectional weld length. The system is tolerant to a wide range of material types, provided normal material standards are observed.

The preferred embodiment also provides a high speed method for weld preparation of the pipe ends. Each successive pipe is brought from the stack to welding by robotic or semi-automatic handling. The ends are butted up and a NC controlled tooling system faces both surfaces to provide extreme accuracy because both surfaces are machined in position at the same time with the same tooling. This produces a fresh accurate joint for the narrow weld. The system has a "real time" joint tracking aerial to ensure that the joint is in the center of the weld. On the pile welding, a groove is machined in to guide basic robot. The machining/welding operation can be performed on a rotating pipe or on a stationary pipe where the robot rotates about the pipe. The robot can also move laterally so that the pipe can be continuously deployed. Heave compensation is also robotic. This operation, like the welding parameters, is microprocessor controlled for repeatable precision. In the case of the drill pipe, the pipe is retrieved and cut by the same NC system to restack the pipe ready for the next production drill.

The machining can be performed by using single or multiple rigid tools, or by rotating or oscillating machining systems. Materials for these tools would be typically carbides or ceramics. Pre-machining is possible but on-site advantages would be lost.

Advantages

The integrity of the joint and the metallurgical quality are unsurpassed by any other method. The speed of assembly of the pieces is rapid, in most cases, only seconds, as the high energy weld can be used at high speed. This is also the reason for the lack of a heat affected zone.

The system uses a process employing a microprocessor robot to control the welding parameters (typically up to 90 parameters), the machining, the gathering and position of pipes and coordinates the deployment of pipe during joint processing. This provides for continuous deployment of pipe concurrently with joint production, providing the highest efficiency and the highest profit for pipe operations.

The processor controlled parameters can be backed by an expert system (AI) to continuously monitor and improve all the metallurgical and materials handling parameters to guarantee quality of the pipe on an instant real time basis. This also provides for continuous deployment, bringing the highest efficiency and highest profit to pipe operations.

Simulated operator training is a further safety and cost cutting advantage of the robotic system, as this is only a simple extension of the expert system mode.

Safety is a prime advantage of this system. The robotic function of the system, particularly in oil drilling, eliminates the gantry, rotary table and wrench system, areas of many serious accidents.

The dangers of operating heavy machinery from heaving ships' platforms are also eliminated.

Controlled overall quality is perhaps the greatest advantage of the system. This is brought about by simplicity and the well principled elements of the metallurgical machining and materials handling which are all integral and coordinated from a multi-backup processor/controller, supported by an expert system that continuously monitors and improves the system, on a real time basis. The quality is built into the pipe during processing and is monitored real time for deviation and correction so that deployment is continuous. The continuous section and integrity provides full strength in tension compression and bending.

The full strength in bending is a strong advantage in angle drilling of wells (curved deviation) and is very important in "J" lay operation where pipe is assembled continuously in a vertical mode and then curved through 90 degrees to lay horizontally on the seabed.

This strength is also important to provide an even bend where production pipes are laid on uneven terrain.

The present rigid jointed pipes cause concentrated stresses in the assembly whenever the pipe is under bending stress.

Strength to weight is at the best level available. Material savings are at the highest attainable level.

What is claimed is:

1. A welding apparatus for connecting pipe sections without connectors comprising;

means for vertically arranging a first, upper pipe segment in alignment with a second, lower pipe segment, each pipe segment having pipe ends having surfaces;

means for butting the upper pipe segment to the lower pipe segment;

means for machining in place butting up ends of associated pipe sections with automated tooling means for weld preparation of pipe ends including facing both surfaces wherein both surfaces are machined in position at the same time with the same tooling wherein fresh accurate joints are produced to receive a weld; and performing a welding operation on ends of associated pipe wherein said robot means rotates about the pipe and each section of pipe is fed into said vertical portable robot for high energy weld of said first pipe section to said second section of pipe.

2. The welding apparatus for connecting pipe sections of claim 1 wherein the method includes a "real time" joint tracking aerial to ensure that the joint is in center of weld.

3. The welding apparatus for connecting pipe sections of claim 1 wherein said robotic means can also move laterally so that the pipe can be continuously deployed.

4. The welding apparatus for connecting pipe sections of claim 3 wherein said robotic means provides for heave compensation.

5. The welding apparatus for connecting pipe sections of claim 1 wherein welding parameters are microprocessor controlled for repeatable precision such that pipe is retrieved and cut by the same control system to restack the pipe ready for the next production drill.

6. The welding apparatus for connecting pipe sections of claim 1 wherein preheat treatment can be programmed into process parameters to control the microstructure of super strength alloys by jumping said beam fore and aft of the weld during rotation.

7. A welding apparatus for connecting pipe sections comprising;

drilling pipe means for production pipe deployment having a lurality of sections of pipe arranged in a stack each pipe having an end;

automated tooling means for weld preparation of each pipe end in place including facing both surfaces wherein both surfaces are machined in position at the same time with the same tooling wherein fresh accurate joints are produced to receive a weld;

robotic means for providing a high energy weld beam for welding of said first pipe section to a second pipe section comprising a vertical robot arranged to rotate about the pipe;

welding mean for forming high energy deep penetration weld comprising electron beam a narrow weld zone; and robotic means for controlling high speed welding wherein the surrounding metal quenches the narrow weld zone at such a rate that grain growth and alloy dissolution does not change in the weld area.

8. The apparatus of claim 7 wherein a high energy weld takes place robotically at extremely high speed wherein the surrounding metal quenches the narrow band of weld metal at such a rate that grain growth and alloy dissolution does not change in the weld area.

9. The apparatus of claim 7 wherein preheat treatment can be programmed into process parameters to control the microstructure of super strength alloys by jumping the beam fore and aft of the weld during rotation.

10. The apparatus of claim 7 wherein an angled joint is provided in the pipe section, the weld is longer than the section span of the pipe to provide a total weld length that is higher than the cross section of the pipe, providing 100% pipe integrity and no loss of cross sectional length.

* * * * *